United States Patent
Holmberg

(10) Patent No.: US 9,567,161 B2
(45) Date of Patent: Feb. 14, 2017

(54) FASTENING DEVICE AND SYSTEM

(71) Applicant: Tim Holmberg, Cresbard, SD (US)

(72) Inventor: Tim Holmberg, Cresbard, SD (US)

(*) Notice: Subject to any disclaimer, the term of this patent is extended or adjusted under 35 U.S.C. 154(b) by 0 days.

(21) Appl. No.: 14/781,848

(22) PCT Filed: Apr. 1, 2014

(86) PCT No.: PCT/US2014/032580
§ 371 (c)(1),
(2) Date: Oct. 1, 2015

(87) PCT Pub. No.: WO2014/165545
PCT Pub. Date: Oct. 9, 2014

(65) Prior Publication Data
US 2016/0039612 A1    Feb. 11, 2016

Related U.S. Application Data

(60) Provisional application No. 61/807,253, filed on Apr. 1, 2013.

(51) Int. Cl.
*F16B 5/02* (2006.01)
*B65G 21/20* (2006.01)

(52) U.S. Cl.
CPC ............ *B65G 21/2072* (2013.01); *F16B 5/02* (2013.01)

(58) Field of Classification Search
CPC ........................................................ F16B 5/02
See application file for complete search history.

(56) References Cited

U.S. PATENT DOCUMENTS

| | | | | |
|---|---|---|---|---|
| 4,671,583 A * | 6/1987 | Olson | ................... | B64D 45/02 439/801 |
| 7,484,617 B1 * | 2/2009 | Flood, Jr. | ........... | B65G 21/2081 198/836.1 |
| 7,877,948 B2 * | 2/2011 | Davies | ................... | B60R 13/01 411/354 |
| 8,328,460 B2 * | 12/2012 | Cooper | .................... | F16B 5/02 403/213 |
| 8,492,004 B2 * | 7/2013 | Watanabe | ............... | F16B 2/005 428/212 |
| 9,222,369 B2 * | 12/2015 | Mulcaire | ............... | F01D 25/243 |
| 2010/0044524 A1 * | 2/2010 | Sugaya | ................. | F16B 33/002 248/49 |

(Continued)

*Primary Examiner* — Thomas Randazzo
(74) *Attorney, Agent, or Firm* — Schmeiser, Olsen & Watts LLP

(57) ABSTRACT

A fastening device includes a base member having a plurality of apertures, wherein the apertures are spaced apart substantially the same distance; and a plurality of nut receiver coupled to the base member at the apertures, wherein the nut receiver includes an alignment member having an aperture corresponding to the aperture of the base member, and a side member, wherein the side member is coupled between the base member and the alignment member. The nut receiver includes an opening between the base member and alignment member to removably receive a nut therein. Once within the alignment member, the alignment member operates to retain the nut in a fixed orientation to allow the securing of a sealing member to the base by use of a bolt that engages the nut after extending through the sealing member and the aperture in the base member.

16 Claims, 5 Drawing Sheets

(56) References Cited

U.S. PATENT DOCUMENTS

| | | | |
|---|---|---|---|
| 2010/0086348 A1* | 4/2010 | Funahashi | H02G 3/0456 403/306 |
| 2013/0145605 A1* | 6/2013 | Kajimura | E01F 15/0423 29/525.02 |
| 2014/0047697 A1* | 2/2014 | Morris | B25B 27/14 29/466 |

* cited by examiner

FASTENING DEVICE AND SYSTEM

CROSS REFERENCE TO RELATED APPLICATION[S]

This application claims priority to PCT Application entitled "Fastening Device and System," Ser. No. PCT/US14/32580, filed Apr. 1, 2014 and U.S. Provisional Patent Application entitled "Fastening Device and System," Ser. No. 61/807,253, filed Apr. 1, 2013, the disclosures of which is hereby incorporated entirely herein by reference.

BACKGROUND OF THE INVENTION

Technical Field

This invention relates generally to a fastening device and system and more particularly to a fastening device and system for securing a sealing member of a material handling equipment.

State of the Art

Conventional material handling equipment typically has a conveyor or other handling device that moves material. This conventional material handling equipment typically have a sealing member or a skirt that is bolted to the frame in order to better control the unwanted spreading/leaking of debris. The sealing member keeps the material/debris in the location that is desired.

These conventional, bolted on sealing members are difficult to change, requiring a lot of man hours to make repairs if damaged or completely replace the skirt. Further, conventional sealing members or skirts require two workers to perform the job.

Accordingly, there is a need for an improved fastening device and system for a coupling a sealing member to material handling equipment.

DISCLOSURE OF EMBODIMENTS

The present invention relates to a fastening device and system for securing a sealing member of a material handling loading zone or containment area. This designed fastening system also is used to fasten multiple quantities of material together to create structurally integral supports, hoppers, structures, and any other structural connection joint.

The first most important feature of this item is the creation of making a two person related job into a single person job. The second almost as important feature is that once designed and built this device does not require any additional welding for maintaining fastener integrity due to unexpected thread deterioration either by stretching, breaking, or cross threading as new hardware can be inserted without the use of cumbersome tools into the existing caged apparatus.

Embodiments of a fastening device includes a base member having a plurality of apertures, wherein the apertures are spaced apart substantially the same distance; and a nut receiver coupled to the base member at the apertures, wherein the nut receiver includes an alignment member having an aperture corresponding to the aperture of the base member, and a side member, wherein the side member is coupled between the base member and the alignment member. The side member extends from one side of the alignment member to the other around a bottom perimeter portion of the alignment member. This creates an opening between the base member and alignment member, wherein the opening is of a size and shape to removably receive a nut or threaded fastener (bolt) therein. Once within the alignment member, the alignment member operates to retain the nut/bolt in a fixed orientation to allow the securing of a sealing member to the base by use of a nut/bolt that engages the nut/bolt after extending through the sealing member and the aperture in the base member.

Another embodiment includes a material handling device. The material handling device comprises material moving equipment, a fastening device and a sealing member. The fastening device comprises a base member comprising a plurality of apertures, wherein the apertures are spaced apart substantially the same distance; and a nut receiver coupled to the base member at the apertures. The nut receiver may comprise an alignment member comprising an aperture corresponding to the aperture of the base member; and a side member, wherein the side member is coupled between the base member and the alignment member. The sealing member may comprise apertures corresponding to the plurality of apertures of the base member, wherein a nut is removably received within each nut receiver and retained in a fixed rotational orientation; a bolt extends through each aperture of the sealing member and each aperture of the base member to engage the nut within each nut receiver; and the aperture of the alignment member is configured to allow an end of the bolt to extend there through.

Another embodiment includes a method of using a fastening system. The method may comprise removably receiving a nut within a nut receiver of a fastening device; retaining the nut in a fixed rotational orientation by the nut receiver; and removably coupling a sealing member to a base member of the fastening device in response to a bolt extending through corresponding apertures of the sealing member and the base member and engaging the nut.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS

Figure 1:
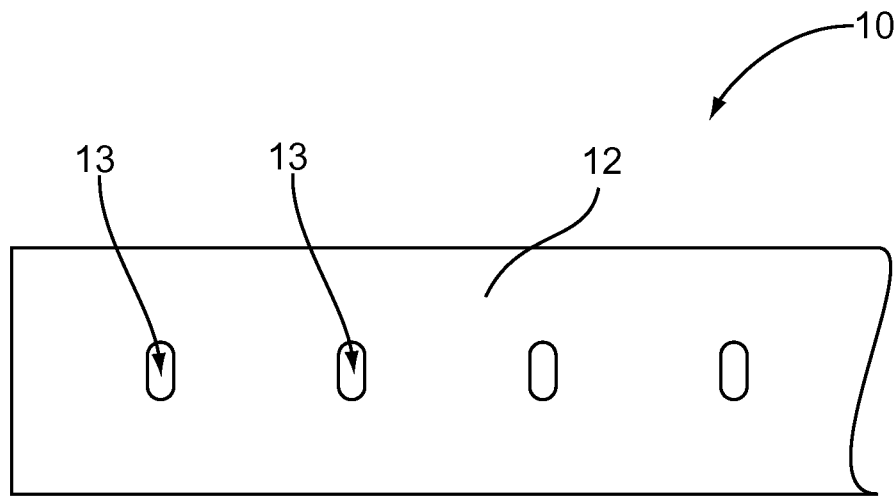
FIG. 1 is a front view of fastening device.
Figure 2:
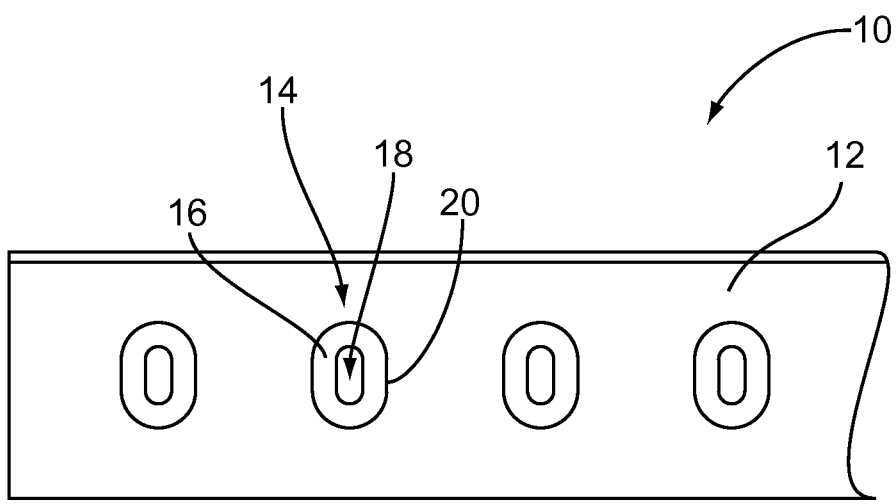
FIG. 2 is a back view of a fastening device.
Figure 3:
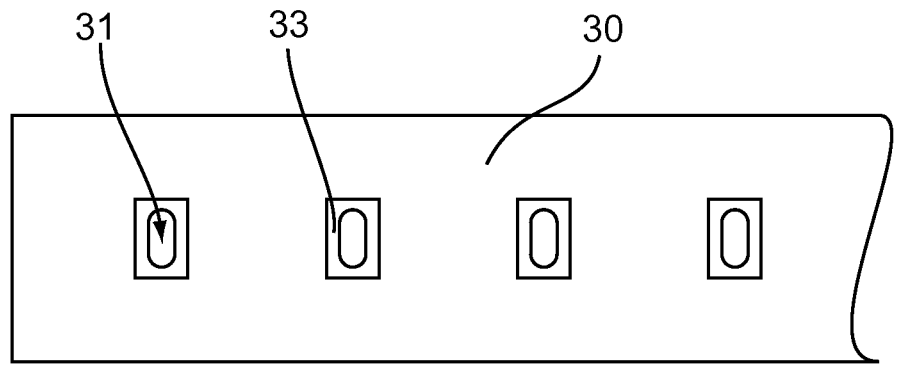
FIG. 3 is a front view of a sealing member.

As discussed above, embodiments of the present invention relate to a fastening device and system for securing a sealing member of a material separator.

As shown in FIGS. 1-7, embodiments of a fastening device 10 includes a base member 12 having a plurality of apertures 13, wherein the apertures 13 are spaced apart substantially the same distance. The fastening device 10 further includes a nut receiver 14 coupled to the base member 12 at the apertures 13. The nut receiver 14 includes an alignment member 16 having an aperture 18 corresponding to the aperture 13 of the base member 12, and a side member 20, wherein the side member 20 is coupled between the base member 12 and the alignment member 16. The side member 20 extends from one side of the alignment member 16 to the other side of the alignment member 16 around a bottom perimeter portion of the alignment member 16. Such a configuration, as exemplarily depicted in FIG. 4, creates an opening 32 between the base member 12 and alignment member 16, wherein the opening 32 is of a size and shape to removably receive a nut 36 therein.

Figure 4:
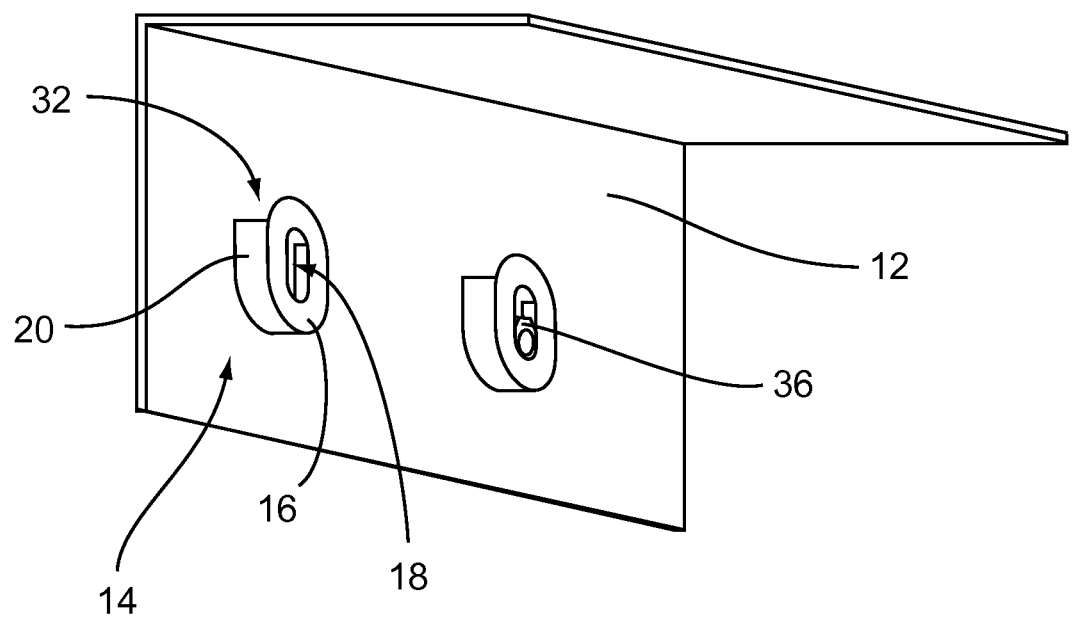
FIG. 4 is a perspective view of a fastening device.
Figure 5:
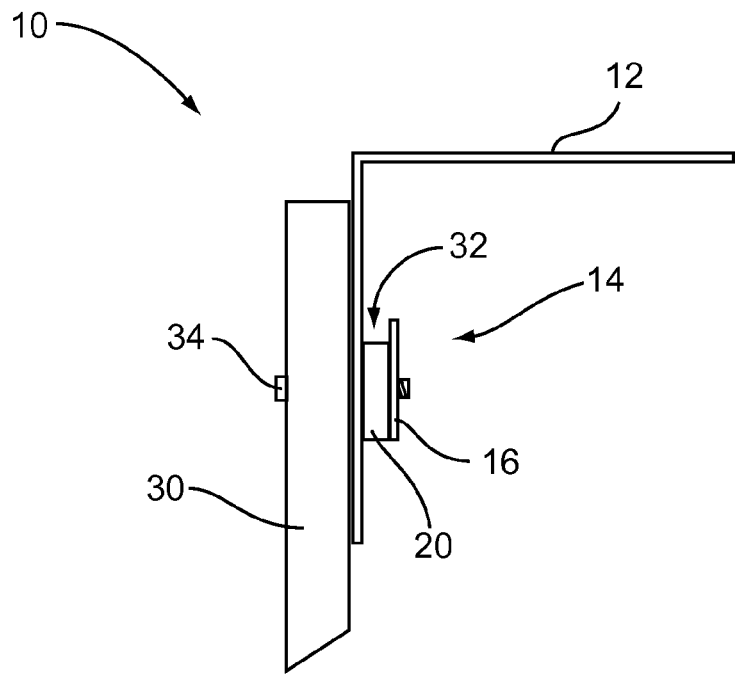
FIG. 5 is an end view of a fastening system with a sealing member.
Figure 6:
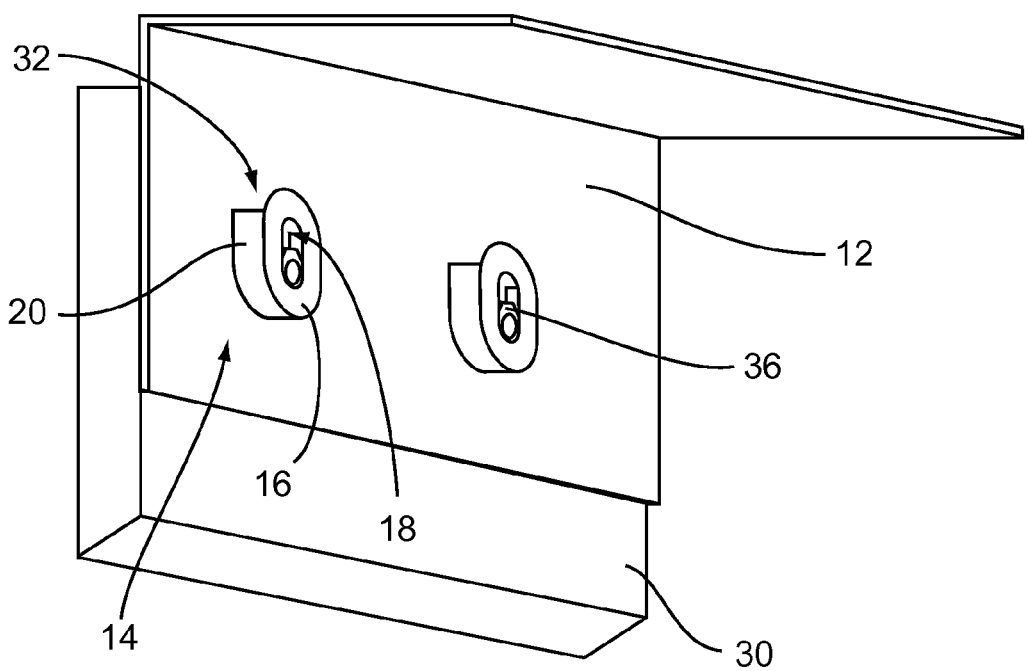
FIG. 6 is a perspective view of a base member of a fastening system with a sealing member.

Once a nut 36 is within the nut receiver 14, as exemplarily depicted in FIG. 4, the nut receiver 14 operates to retain the nut 36 in a fixed orientation to allow the securing of a sealing member 30 to the base member 12, the nut receiver being of a size and shape to functionally engage the nut 36 to prevent the nut 36 from rotating, spinning, or otherwise twisting within the nut receiver 14 in response to external forces acting on the nut 36, such as, for example, the torque exerted by a bolt that functionally engages the nut 36 within the nut receiver 14. The sealing member 30 may have apertures 31 corresponding to the apertures 13 of the base member 12. The apertures 31 may have a recessed lip 33. Securing of the sealing member 30 to the base member 12 is accomplished by use of a bolt 34 that engages the nut 36 after extending through the aperture 31 of the sealing member 30 and the aperture 13 of the base member 12. The bolt 34 may extend through the aperture 18, as needed, when threaded through the nut 36 and the nut receiver 14. The bolt 34 may have a bolt head that engages the lip 33.

In these embodiments, as shown, one or more, or all, of the apertures 13, 18 and 31 are elongate apertures and allow for the bolt 34 to slide within the apertures 13, 18 and 31. This provides for a misalignment feature of the fastening device 10 used in a fastening system. If for some reason, the apertures 13, 18 and 31 are unable to align perfectly; the slotted shaped or elongate apertures 13, 18 and 31 allow the bolt 34 and the nut 36 to be slid into a proper location to secure the sealing member 30 to the base member 12, regardless of the alignment issues. Further because of the configuration of the apertures 13, 18 and 31, this misalignment feature operates automatically.

Figure 7:
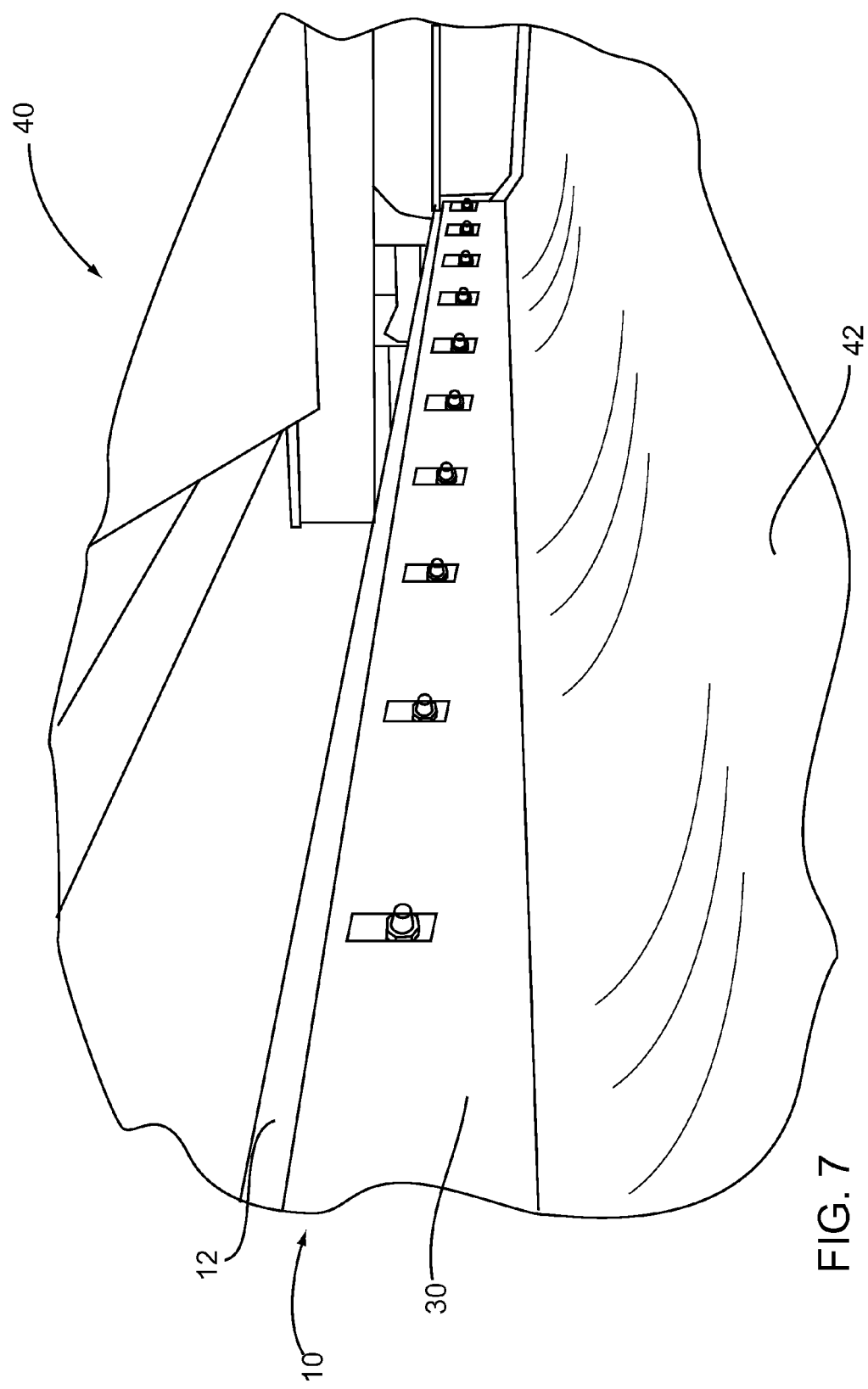
FIG. 7 is a perspective view of a fastening system coupled to a type of material handling equipment.

This fastening device 10 and system using the fastening device 10 results in allowing only one worker to secure and remove the sealing member 30 to and from the base member 12. Additionally, there is no wrench required to hold the nut because the nut receiver 14 operates to keep the nut in a fixed position. Because of these features, it also allows for the manufacture of more widened width of conveyors to better utilize unusable space and material. This is particularly convenient when multiple materials are being collected and used in tightly confined spaces between integrated components within a manufactured assembly. As shown in FIG. 7, material handling device 40 has a fastening system 10 coupled within it, wherein the base member 12 is coupled to a sealing member 30. Material is deposited onto surface 42 of the material handling device 40 and the surface 42 operates to move material along the surface 42. This can be a shaker, a conveyor or other type of material processing equipment. The sealing member 30 limits the ability of material on surface 42 to move under the sealing member 30 and contains the particles on the surface 42.

Figure 8:
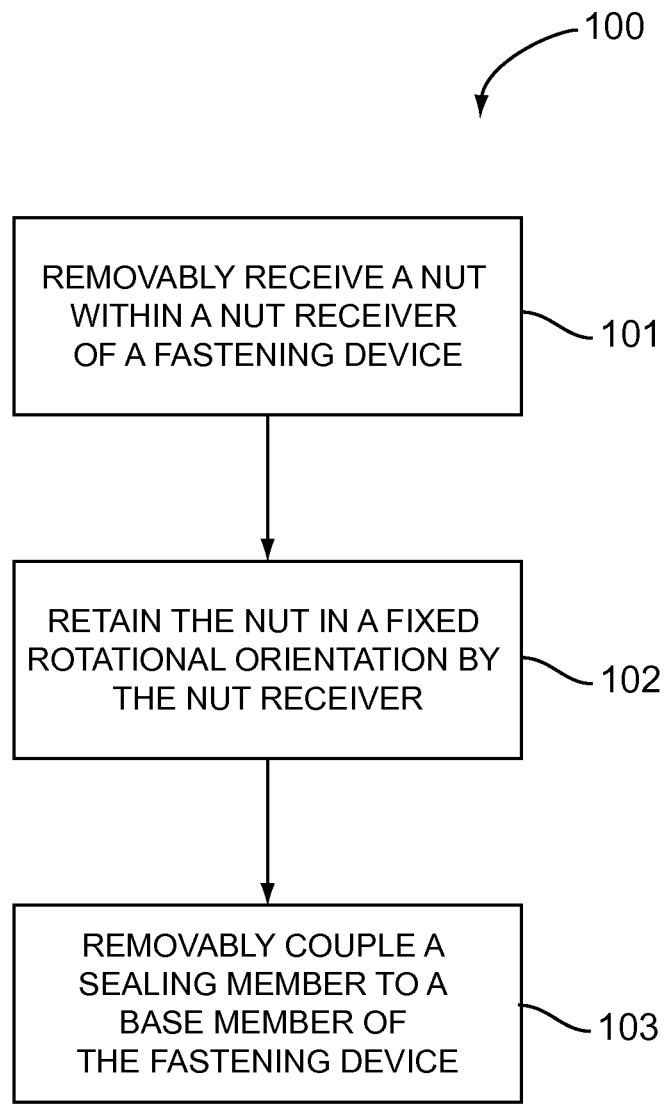
FIG. 8 is a flow chart of a method of using a fastening device.

Referring to FIG. 8, another embodiment includes a method 100 of using a fastening device. The method 100 comprised removably receiving a nut within a nut receiver of a fastening device (Step 101; retaining the nut in a fixed rotational orientation by the nut receiver (Step 102); and removably coupling a sealing member to a base member of the fastening device (Step 103). Step 103 occurs in response to a bolt extending through corresponding apertures of the sealing member and the base member and engaging the nut.

In embodiments, the method 100 may further comprise tightening the bolt engagement with the nut in response to one worker tightening the bolt and the nut receiver holding the nut in the fixed rotational orientation, wherein tightening the bolt engagement further comprises automatically operating a misalignment feature, wherein the bolt and the nut slide along the apertures of the sealing member and the base to move the bolt and nut into a proper position to tighten.

In embodiment, the method may also comprise loosening the bolt engagement with the nut in response to one worker loosening the bolt and the nut receiver holding the nut in the fixed rotational orientation; removing the sealing member; and removing the nut from the nut receiver.

The components defining any fastening device and system may be formed of any of many different types of materials or combinations thereof that can readily be formed into shaped objects provided that the components selected are consistent with the intended operation of a fastening device and system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any fastening device and system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A fastening device for material handling sealing members comprising:
    a base member having a plurality of apertures, wherein the apertures are spaced apart substantially the same distance; and
    a nut receiver coupled to the base member at the apertures, wherein the nut receiver comprises:
        an alignment member having an aperture corresponding to the aperture of the base member;
        a side member, wherein the side member is coupled between the base member and the alignment member, the side member extends from one side of the alignment member to an opposing side of the alignment member, extending around a bottom perimeter portion of the alignment member; and
        a space formed between the base member, the alignment member and the side member.

2. The fastening device of claim 1, wherein the space is of a size and shape to removably receive a nut.

3. The fastening device of claim 2, wherein the alignment member retains the nut in a fixed rotational orientation to allow for engagement with a bolt.

4. The fastening device of claim 1, wherein the space is of a size and shape to removably receive a bolt.

5. The fastening device of claim 4, wherein the alignment member retains the bolt in a fixed rotational orientation to allow for engagement with a nut.

6. A material handling device comprising:
    material moving equipment;
    a fastening device comprising:
        a base member comprising a plurality of apertures, wherein the apertures are spaced apart substantially the same distance; and
        a nut receiver coupled to the base member at the apertures, wherein the nut receiver comprises:
            an alignment member comprising an aperture corresponding to the aperture of the base member;
            a side member, wherein the side member is coupled between the base member and the alignment member, the side member extends from one side of the alignment member to an opposing side of the alignment member, extending around a bottom perimeter portion of the alignment member; and
            a space formed between the base member, the alignment member and the side member; and
    a sealing member comprising apertures corresponding to the plurality of apertures of the base member, wherein:
        a nut is removably received within at least one of the nut receivers and retained in a fixed rotational orientation;
        a bolt extends through the aperture of the sealing member and the aperture of the base member to engage the nut within the at least one of the nut receivers; and
        the aperture of the alignment member is configured to allow an end of the bolt to extend there through.

7. The material handling device of claim 6, wherein the space is of a size and shape to removably receive a nut.

8. The material handling device of claim 6, wherein the apertures of the sealing member, the apertures of the base member and the apertures of the nut receiver are elongate apertures.

9. The material handling device of claim 8, wherein the fastening device further comprises a misalignment feature, wherein the elongate apertures of the sealing member, base member and nut receivers allow the bolt and the nut to be slid into a location to secure the sealing member to the base member when the apertures are not aligned.

10. The material handling device of claim 9, wherein the misalignment feature operates automatically in response to the elongate shape of the apertures.

11. A method of using a fastening system, the method comprising:
    removably receiving a nut within a nut receiver of a fastening device of claim 1;
    retaining the nut in a fixed rotational orientation by the nut receiver; and
    removably coupling a sealing member to a base member of the fastening device in response to a bolt extending through corresponding apertures of the sealing member and the base member and engaging the nut.

12. The method of claim 11, wherein tightening the bolt engagement further comprises automatically operating a misalignment feature, wherein the bolt and the nut slide along the apertures of the sealing member and the base to move the bolt and nut into a proper position to tighten.

13. The method of claim 11, further comprising tightening the bolt engagement with the nut in response to one worker tightening the bolt and the nut receiver holding the nut in the fixed rotational orientation.

14. The method of claim 13, further comprising loosening the bolt engagement with the nut in response to one worker loosening the bolt and the nut receiver holding the nut in the fixed rotational orientation.

15. The method of claim 14, further comprising removing the sealing member.

16. The method of claim 15, further comprising removing the nut from the nut receiver.

* * * * *